(12) United States Patent
Tenegal et al.

(10) Patent No.: US 10,227,236 B2
(45) Date of Patent: *Mar. 12, 2019

(54) METHOD FOR PRODUCING SUBMICRON-SIZED PARTICLES INCLUDING ALUMINUM BY LASER TREATMENT

(71) Applicant: NANOMAKERS, Rambouillet (FR)

(72) Inventors: François Tenegal, Paris (FR); Adrien Reau, Montpellier (FR)

(73) Assignee: NANOMAKERS, Rambouillet (FR)

( * ) Notice: Subject to any disclaimer, the term of this patent is extended or adjusted under 35 U.S.C. 154(b) by 0 days.

This patent is subject to a terminal disclaimer.

(21) Appl. No.: 15/039,824

(22) PCT Filed: Nov. 28, 2014

(86) PCT No.: PCT/EP2014/076021
§ 371 (c)(1),
(2) Date: May 26, 2016

(87) PCT Pub. No.: WO2015/079050
PCT Pub. Date: Jun. 4, 2015

(65) Prior Publication Data
US 2016/0376158 A1    Dec. 29, 2016

(30) Foreign Application Priority Data
Nov. 29, 2013  (FR) ..................... 13 61856

(51) Int. Cl.
*C01B 33/029* (2006.01)
*C01B 33/027* (2006.01)
(Continued)

(52) U.S. Cl.
CPC .............. *C01B 33/029* (2013.01); *B01J 4/001* (2013.01); *B01J 4/002* (2013.01); *B01J 4/004* (2013.01);
(Continued)

(58) Field of Classification Search
CPC . B01J 19/081; B01J 4/001; B01J 4/004; B01J 4/002; B01J 12/005; B01J 19/24;
(Continued)

(56) References Cited

U.S. PATENT DOCUMENTS 4,424,066 A    1/1984   Sarin et al.
4,505,720 A    3/1985   Gabor et al.
(Continued)

FOREIGN PATENT DOCUMENTS

WO        01/32799 A1       5/2001
WO    WO-2008019905 A1 *   2/2008   ............. B82Y 30/00

OTHER PUBLICATIONS

Stopic et al, "Synthesis of TiO2 core/RuO2 shell particles using multistep ultrasonic spray pyrolysis," Materials Research Bulletin 48 (2013) pp. 3633-3635 (Year: 2013).*
(Continued)

*Primary Examiner* — Nicholas A Smith
*Assistant Examiner* — Colleen M Raphael
(74) *Attorney, Agent, or Firm* — Greer, Burns & Crain, Ltd.

(57) ABSTRACT

A method for producing particles, includes the following steps: introducing into a reaction chamber at least one reaction flow including a first chemical element (typically silicon) and propagating in a flow direction; projecting a ray beam through the reaction chamber, intersecting each reaction flow in an reaction flow interaction area, in order to form, in each reaction flow, the cores of particles including the first chemical element, and introducing, in the reaction
(Continued)

chamber, a second chemical element, interacting with each reaction flow in order to cover the cores of particles with a layer including the second chemical element. Each reaction flow is preferably free of an agent oxidizing the first chemical element.

12 Claims, 5 Drawing Sheets (51) Int. Cl.
    *B01J 13/04* (2006.01)
    *B01J 12/00* (2006.01)
    *B01J 4/00* (2006.01)
    *B01J 19/08* (2006.01)
    *C01B 32/956* (2017.01)
    *B01J 19/24* (2006.01)
    *C09C 1/30* (2006.01)
    *C09C 1/28* (2006.01)
    *B01J 19/12* (2006.01)

(52) U.S. Cl.
    CPC .............. *B01J 12/005* (2013.01); *B01J 13/04* (2013.01); *B01J 19/081* (2013.01); *B01J 19/121* (2013.01); *B01J 19/24* (2013.01); *C01B 32/956* (2017.08); *C01B 33/027* (2013.01); *C09C 1/28* (2013.01); *C09C 1/30* (2013.01); *C09C 1/3045* (2013.01); *B01J 2219/00139* (2013.01); *B01J 2219/0875* (2013.01); *C01P 2004/62* (2013.01); *C01P 2004/64* (2013.01); *C01P 2004/86* (2013.01)

(58) Field of Classification Search
    CPC ............. B01J 13/04; B01J 2219/0875; B01J 2219/00139; B01J 19/121; C01B 33/029; C01B 31/36; C01B 33/027; C01B 32/956; C09C 1/28; C09C 1/30; C09C 1/3045; C01P 2004/62; C01P 2004/86; C01P 2004/64; C01P 2004/06

See application file for complete search history.

(56) References Cited

U.S. PATENT DOCUMENTS

| | | | |
|---|---|---|---|
| 5,874,134 A * | 2/1999 | Rao | B01J 19/088 |
| | | | 977/778 |
| 8,822,878 B2 | 9/2014 | Tenegal et al. | |
| 9,005,511 B2 | 4/2015 | Tenegal et al. | |
| 2005/0016839 A1* | 1/2005 | Horne | C23C 16/403 |
| | | | 204/242 |
| 2009/0026421 A1 | 1/2009 | Li et al. | |
| 2010/0221544 A1 | 9/2010 | Baumer et al. | |
| 2015/0299861 A1* | 10/2015 | Leconte | B01J 19/121 |
| | | | 427/586 |

OTHER PUBLICATIONS

Dumitrache et al, "Nearly monodispersed carbon coated iron nanoparticles for the catalytic growth of nanotubes/nanofibres," Diamond and Related Materials 13 (2004) pp. 362-370 (Year: 2004).*
Luther et al., "'Alumina' Surface Modification of Silicon Nitride for Colloidal Processing", Journal of the American Ceramic Society (1995), 78(8), pp. 2009-2014.
Rodot et al., "Metallisation par CVD Assistee par Laser," Vide (1985), 40(227), pp. 339-343.
French Search Report from French Patent Application No. 1361856, dated Oct. 14, 2014.
International Search Report from International Patent Application No. PCT/EP2014/076021, dated Mar. 3, 2015.

* cited by examiner

METHOD FOR PRODUCING SUBMICRON-SIZED PARTICLES INCLUDING ALUMINUM BY LASER TREATMENT

BACKGROUND

The present invention relates to a process for producing multilayer particles (typically a core layer covered with an upper layer), typically by laser pyrolysis. It also relates to an associated device.

Such a process enables a user for example to manufacture submicron particles of silicon or silicon carbide, each covered with a layer of aluminium or aluminium oxide.

Processes for producing a material are known in which the raw material used is a mixture of two powders, at least one of which is characterized by an average grain size in the nanometric range:
- a powder of particles of a first type, for example of silicon carbide, and
- a powder of particles of a second type, which are particles of aluminium or aluminium oxide.

Then the whole is heated to a moderate temperature, optionally under pressure, without bringing it to the melting temperature ("sintering" process), in order to obtain a dense nanostructured material.

There may be problems of inhomogeneity between the silicon carbide and the aluminium oxide or the aluminium in the material obtained, in particular arising from difficulties in mixing two powders, at least one of which is a nanometric powder. These difficulties arise from the agglomeration forces, which are greater in the case of nanometric powders, and which make it difficult to obtain a material of homogeneous microstructure or nanostructure when a powder of nanometric size is used.

Moreover, there may be problems of binding or of chemical compatibility between the particles of the two powders, making it necessary to carry out chemical or thermal post-treatments on the powders before using them.

The aim of the invention is to propose:
- a novel raw material,
- a process for producing this raw material,
- various uses of this raw material.

SUMMARY

This aim is achieved with a process for producing particles, comprising the following steps:
- Introducing, into a reaction chamber, at least one reaction stream comprising a first chemical element (typically silicon), propagating in one direction of flow,
- Projecting a radiation beam through the reaction chamber, intersecting with each reaction stream in one interaction zone per reaction stream, in order to form, in each reaction stream, particle cores comprising the first chemical element, and
- Introducing, into the reaction chamber, a second chemical element (typically aluminium), interacting with each reaction stream in order to cover the particle cores with a layer comprising the second chemical element.

The particles produced are preferably submicron particles, i.e. particles the diameter of which is less than 1000 nanometers, preferably comprised between 1 nanometer and 1000 nanometers. Preferably, the submicron particles are nanometric particles, i.e. particles the diameter of which is less than 100 nanometers, preferably comprised between 1 nanometer and 100 nanometers. By "diameter of a particle" is meant the distance between the two most distant points of this particle (for example the length in the case of a rod-shaped particle). Similarly, by "core diameter" of a particle is meant the distance between the two most distant points of this core. Similarly, by "diameter of the layer comprising the second chemical element" is meant the outside diameter, i.e. the distance between the two most distant points of this layer.

Each reaction stream is preferably devoid of any agent that oxidizes the first chemical element, and the particle cores preferably comprise the first chemical element in the non-oxidized form. Thus, by dispensing with an oxidizing agent that is capable of oxidizing the first chemical element, particles may be obtained the core of which comprises the non-oxidized first element. The layer of second element protects the core against oxidation, and makes it possible to keep the first element in a non-oxidized state, which leaves more choice for the possible uses of the particles produced at lower cost. This makes it possible to keep the first element of the core non-oxidized for novel uses of non-oxidized particles without the need to apply a treatment that aims to reduce the oxygen content.

Thus, such a process according to the invention enables a user for example to manufacture submicron particles of non-oxidized silicon or of non-oxidized silicon carbide, each covered with a layer of pure or oxidized aluminium.

The number of atoms of the second element introduced relative to the number of atoms of the first element introduced preferably corresponds to a ratio that is fixed by the thickness of the layer to be produced. This ratio is calculated from the molecular weights and densities of the materials:
- pure aluminium or aluminium oxide for the layer depending on the use, and
- for the core, silicon if the reaction stream for producing the particle core only contains the element silicon, or silicon carbide if the reaction stream contains, in addition to the element silicon, the element carbon in a ratio close to 1 to 1 (1 molecule for the element silicon and 1 molecule for the element carbon).

An additional parameter taking into account the aggregation of the particles may be introduced in the calculation of the molar ratio.

The second chemical element may be introduced into the chamber in a gas stream surrounding each reaction stream.

The second chemical element may be introduced into the chamber in a peripheral gas stream surrounding each reaction stream, emitted from several points distributed along a closed curve surrounding each reaction stream and propagating in the direction of each reaction stream. The second chemical element is preferably introduced into the chamber in the peripheral gas stream after the interaction zone of each reaction stream with the radiation beam. These arrangements make it possible to maintain complete flexibility of the process, allowing the particle cores to be produced, and in particular full capacity for producing cores of adjustable size. These embodiments significantly improve control of the homogeneity of distribution and thickness of the layer of second element on each particle core.

The process according to the invention may further comprise a step of introducing, into the reaction chamber, before the interaction zone of each reaction stream, a confining gas stream surrounding each reaction stream and propagating in the direction of flow. The second chemical element may be introduced into the chamber in the confining gas stream before the interaction zone of each reaction stream.

The introduction of at least one reaction stream may comprise introducing at least one alignment of several reaction streams separated from one another by the confining gas stream and each comprising the first chemical element and each propagating in the direction of flow.

The radiation beam can propagate in a direction of radiation preferably perpendicular to the direction of flow, and the streams of each alignment of reaction streams may be aligned in a direction of alignment perpendicular to the direction of flow and to the direction of radiation.

The radiation beam can propagate in a direction of radiation preferably perpendicular to the direction of flow, and each reaction stream may have, in a plane perpendicular to the direction of flow, a section extending longitudinally in a direction of elongation perpendicular to the direction of flow and to the direction of radiation.

The second chemical element may be introduced into the chamber with the first chemical element in each reaction stream before the interaction zone of each reaction stream.

The first chemical element is preferably silicon (Si) and:
the particle cores may be of non-oxidized silicon; or
carbon (preferably in the form of acetylene ($C_2H_2$) or $C_2H_4$ or $CH_4$) may be introduced into the chamber with the first chemical element in each reaction stream before the interaction zone of each reaction stream, so that the particle cores comprise (or preferably consist of) silicon carbide (SiC), preferably non-oxidized.

The first chemical element is preferably introduced into the chamber in the form of silane ($SiH_4$).

The second element is preferably aluminium. It is preferably introduced in the form of vaporized trimethylaluminium ($Al(CH_3)_3$), or generally in the form of a compound in the class of aluminium organometallics.

According to yet another aspect of the invention, particles are proposed, obtained by the process according to the invention.

According to yet another aspect of the invention, particles are proposed, each comprising:
a core comprising a first chemical element (preferably silicon) that is not oxidized (typically in the form of silicon (Si) or preferably silicon carbide (SiC)), having a diameter comprised between 3 and 900 nm, preferably comprised between 3 and 99 nm (preferably with a standard deviation between 1 and 90 nm), and
a layer surrounding the core, comprising (preferably consisting only of) a second chemical element (preferably aluminium) and having a layer thickness (not necessarily homogeneous) of at least 0.5 nm, preferably between 0.5 and 50 nm.

The particles are preferably submicron particles, i.e. particles the diameter (core+layer) of which is less than 1000 nanometers, preferably comprised between 1 nanometer and 1000 nanometers. Preferably, the submicron particles are nanometric particles, i.e. particles the diameter (core+layer) of which is less than 100 nanometers, preferably comprised between 1 nanometer and 100 nanometers.

According to yet another aspect of the invention, uses of particles according to the invention are proposed, including:
a process, characterized in that a component is manufactured by sintering a powder comprising (preferably consisting of) particles according to the invention, and/or
a process, in which aluminium particles are mixed with particles according to the invention, then the mixture is heated and then cooled so as to bond the aluminium particles with the particles according to the invention.

According to yet another aspect of the invention, a device is proposed for producing particles, comprising:

a reagent source comprising reagent, this reagent comprising a first chemical element;
a reaction chamber connected to the reagent source;
a reagent injector arranged in order to introduce, into the chamber, and originating from the reagent source, at least one reaction stream comprising said reagent, propagating in a direction of flow in one reaction stream zone per reaction stream,
an emitter of a radiation beam arranged in order to project the radiation beam through the reaction chamber, intersecting with each reaction stream zone in one interaction zone per reaction stream,
a source of a second chemical element, and
an injector of the second element arranged in order to introduce, into the reaction chamber, the second chemical element from the source of the second element in such a way that this second chemical element is able to interact in the chamber with each reaction stream.

The reagent is preferably devoid of any agent arranged for oxidizing the first chemical element.

The injector of the second element and the injector of the first element are preferably arranged together in order to introduce a number of atoms of the second element relative to a number of atoms of the first element in a ratio allowing the desired thickness to be attained for producing the layer of aluminium or of aluminium oxide.

The injector of the second chemical element may be arranged in order to introduce the second chemical element into the chamber in a gas stream surrounding each reaction stream.

The injector of the second chemical element may be arranged in order to introduce the second chemical element into the chamber in a peripheral gas stream surrounding each reaction stream, emitted from several points distributed along a closed curve surrounding each reaction stream and arranged in order to direct the peripheral gas stream in the direction of each reaction stream. The injector of the second chemical element may be arranged in order to introduce the second chemical element into the chamber in the peripheral gas stream after the interaction zone of each reaction stream.

The device according to the invention may further comprise an injector of confining gas arranged in order to introduce into the reaction chamber, before the interaction zone of each reaction stream, a confining gas stream surrounding each reaction stream and propagating in the direction of flow. The injector of the second chemical element may comprise the injector of confining gas.

The injector of at least one reaction stream may be arranged in order to introduce, into the chamber, at least one alignment of several reaction streams separated from one another by the confining gas stream and each comprising the first chemical element and each propagating in the direction of flow.

The emitter may be arranged so that the radiation beam propagates in a direction of radiation preferably perpendicular to the direction of flow, and the injector of at least one reaction stream may be arranged so that the streams of each alignment of reaction streams are aligned in a direction of alignment perpendicular to the direction of flow and to the direction of radiation.

The emitter may be arranged so that the radiation beam propagates in a direction of radiation preferably perpendicular to the direction of flow, and the injector of at least one reaction stream may be arranged so that each reaction stream has, in a plane perpendicular to the direction of flow, a section extending longitudinally in a direction of elongation perpendicular to the direction of flow and to the direction of radiation.

The injector of the second chemical element may be arranged in order to introduce the second element into the chamber with the first chemical element in each reaction stream before the interaction zone of each reaction stream.

The first chemical element is preferably silicon (Si) and:
the reagent may comprise silane ($SiH_4$), and/or
the reagent may comprise carbon (preferably in the form of acetylene ($C_2H_2$) or $C_2H_4$ or $CH_4$).

The second element is preferably aluminium.

BRIEF DESCRIPTION OF THE DRAWINGS

Other advantages and characteristics of the invention will become apparent on examination of the detailed description of an embodiment which is in no way limitative, and the attached diagrams, in which.

DETAILED DESCRIPTION

As these embodiments are in no way limitative, variants of the invention can be considered comprising only a selection of the characteristics described hereinafter, in isolation from the other characteristics described (even if this selection is isolated within a phrase containing other characteristics), if this selection of characteristics is sufficient to confer a technical advantage or to differentiate the invention with respect to the state of the art. This selection comprises at least one, preferably functional, characteristic without structural details, or with only a part of the structural details if this part alone is sufficient to confer a technical advantage or to differentiate the invention with respect to the state of the prior art.

A first embodiment of the device 9 according to the invention will be described first, referring to FIGS. 1 to 6.

This first embodiment of the device 9 for producing particles 10 by laser pyrolysis comprises a reagent source 4. The reagent preferably comprises at least one reaction gas and/or at least one reaction liquid in the form of aerosol. The reagent comprises a first chemical element. The first chemical element is preferably a metal (preferably from iron, aluminium, titanium) or a metalloid (from boron, silicon, germanium, arsenic, antimony, tellurium, polonium). More precisely, the first chemical element in the reagent is preferably silicon, preferably in the form of $SiH_4$. The reagent is preferably reaction gas (typically $SiH_4$ gas, or $SiH_4+C_2H_2$ or $SiH_4+C_2H_4$ or $SiH_4+CH_4$ gas).

The device 9 further comprises a reaction chamber 8 (preferably delimited by stainless steel walls) connected to the reagent source 4.

The reaction chamber 8 is filled with a neutral gas atmosphere (from helium, argon, krypton, xenon, nitrogen or a mixture), preferably argon or nitrogen.

A reagent injector 5 is arranged in order to introduce, into the chamber 8 and originating from the reagent source 4, at least one reaction stream 1, 100, 101, 102, 103, 104, 105, 106, each reaction stream propagating in an identical direction of flow 11 for all the reaction streams and in one reaction stream zone 6 per reaction stream.

An emitter 19 (typically a laser source) of a radiation beam 3 (typically a laser beam, preferably having an area between 30 $mm^2$ and 3000 $mm^2$ in cross-section perpendicular to the direction 12, width in direction 13, 18 preferably comprised between 2 and 5 cm, wavelength between 9 microns and 11 microns, preferably 10.6 microns for $SiH_4$ and power comprised between 50 and 5000 W and frequency comprised between 10000 and 100000 Hz) is arranged in order to project the radiation beam 3 through the reaction chamber 8 so that this beam 3 intersects, in one interaction zone 14 per reaction stream zone 6, with each reaction stream zone 6 so that particle cores 15 comprising the first chemical element are formed in each reaction stream.

Thus, each reaction stream 1, 100, 101, 102, 103, 104, 105, 106 or reaction stream zone 6 consists of three parts:
an interaction zone 14 with the beam 3,
a part situated before (relative to the direction of flow 11) its interaction zone 14 and comprising the reagent as introduced into the chamber 8, and
a part situated after (relative to the direction of flow 11) its interaction zone 14 and comprising a flame 26 resulting from the interaction between the reagent and the beam 3 in its interaction zone 14.

The beam 3 is shaped by an optical system to give it a cross-section that is preferably rectangular (but could also be elliptical) and preferably focused vertically (i.e. the area of which decreases with the advance of the beam 3 in the direction of radiation 12), as described in documents FR 2 894 493 and FR 2 877 591.

The beam 3 enters the chamber 8 through a window 23 of ZnSe and leaves the chamber 8 through another window 24 of ZnSe before being stopped by a non-reflective calorimeter 25 ("beam stopper").

The device 9 further comprises a source of a second chemical element. The second chemical element is preferably aluminium injected in the form of trimethylaluminium (or TMA, of chemical formula $Al(CH_3)_3$, or generally in the form of a compound in the class of aluminium organometallics) heated and vaporized preferably in a neutral gas, such as for example argon. An injector of a second element is arranged in order to introduce, into the reaction chamber 8, the second chemical element from the source of second element so that this second chemical element is able to interact in the chamber 8 with each reaction stream 1, 100, 101, 102, 103, 104, 105, 106 in order to cover the particle cores 15 with a layer 16 comprising the second chemical element.

Preferably, the reagent in the source 4 and injected into chamber 8 is devoid of oxidizing agent arranged for oxidizing the first chemical element. By "agent arranged for oxidizing the first chemical element" (also called "oxidizing agent of the first chemical element") is meant any atom or molecule (for example $N_2O$) which, in the reagent (for example $SiH_4$ gas, optionally mixed with $C_2H_2$ or $C_2H_4$ or $CH_4$), has a redox potential with tendency for oxidation of the first chemical element (for example Si) due to the form (for example $SiH_4$) in which it is injected into the chamber 8. Preferably, the reagent in the source 4 and injected into the chamber 8 is devoid of oxygen atoms.

The injector (5, 21 and/or 22) of the second element and the injector 5 of the first element are arranged together within the device 9 (by their flow rate and their proportions of the various gases, optionally mixed, that they deliver, such as $SiH_4$ for the injector 5, argon or nitrogen for the injector 21 and $C_2H_2$, $C_2H_4$, $CH_4$ for the injector 5 and/or 21 and/or 22) in order to introduce into the reaction chamber 8 per unit of time (typically per minute) a number of atoms of the second element relative to a number of atoms of the first element according to a ratio selected for reaching the desired thickness of the layer 16.

Typically, the injector (5, 21 and/or 22) of the second element and the injector 5 of the first element are arranged together within the device 9 in order to introduce the desired molar ratio between the second and the first element.

For example, to produce particles having a core diameter $D_1$ and a diameter $D_2$ of the layer comprising the second chemical element, the following relationship is used:

$$\frac{n_2}{n_1} = \frac{M_1}{d_1 V_1} \frac{d_2 V_2}{M_2}$$

where:

$n_1$ is the number of atoms constituting the particle core 15, introduced into the reaction chamber (preferably only in at least one reaction stream) per unit of time. For example:
- in the case of a core of pure silicon, it is the number $n_{si}$ of silicon atoms introduced into the reaction chamber per unit of time (preferably only in at least one reaction stream),
- in the case of a "mixed" core such as of silicon carbide, it is the number $n_{si}$ of silicon atoms introduced into the reaction chamber per unit of time (preferably only in at least one reaction stream) plus the number $n_c$ of carbon atoms introduced into the reaction chamber per unit of time (preferably only in the at least one reaction stream), for example assuming $n_{si}=n_c$.

$d_1$ is the density of the material (for example pure silicon, or pure silicon carbide) constituting the core 15 of the particles, $M_1$ is the molecular weight of the material (for example pure silicon or silicon carbide) making up the core 15 of the particles, $V_1$ is the desired volume for a particle core 15 of diameter $D_1$, approximately equal to $$\frac{\pi D_1^3}{6}.$$

$n_2$ is the number of atoms constituting the layer 16, introduced (in the sum of the reaction streams 1, 100, 101, 102, 103, 104, 105, 106, the confining stream 2 and optionally peripheral streams 7 if they are present) into the reaction chamber per unit of time. For example:
- in the case of a layer 16 of pure aluminium, it is the number $n_{Al}$ of aluminium atoms introduced into the reaction chamber per unit of time, $d_2$ is the density of the material (for example pure aluminium or oxidized aluminium) constituting the layer 16, $M_2$ is the molecular weight of the material (for example pure aluminium or oxidized aluminium) constituting the layer 16, $V_2$ is the desired volume for a layer 16, approximately equal to $$\left(\frac{\pi D_2^3}{6} - \frac{\pi D_1^3}{6}\right).$$

The device 9 further comprises a source 20 of confining gas comprising confining gas and an injector 21 of confining gas arranged in order to introduce into the reaction chamber 8, before (relative to the direction of flow 11) the interaction zone 14 of each reaction stream, a confining gas stream 2 (preferably common to all the reaction streams) surrounding each reaction stream 1, 100 101, 102, 103, 104, 105, 106 (more precisely in contact with each reaction stream 1, 100, 101, 102, 103, 104, 105, 106 on the whole perimeter of each reaction stream 1, 100, 101, 102, 103, 104, 105, 106 at least starting from the injection of the reagent into the chamber 8 up to the interaction zone 14 of each reaction stream, this perimeter being defined according to a closed line contained in a plane perpendicular to the direction of flow 11) and propagating in the direction of flow 11.

The confining gas comprises a neutral gas (from helium, argon, nitrogen or a mixture thereof, preferably argon or nitrogen). The confining gas stream 2 has two functions:
- on the one hand, it serves to confine each reaction stream to prevent the reagents of each reaction stream diffusing radially, with the risk of soiling the inner walls of the chamber 8, and
- on the other hand, it serves to cool ("quench effect") each flame 26 of reaction stream created after (relative to the direction of flow 11) the interaction of the beam 3 with each reaction stream 1, 100, 101, 102, 103, 104, 105, 106 respectively.

The emitter 19 is arranged so that the radiation beam 3 propagates in a direction of radiation 12 perpendicular to the direction of flow 11.

The injector 5 of at least one reaction stream 1, 100, 101, 102, 103, 104, 105, 106 is arranged so that each reaction stream 1, 100, 101, 102, 103, 104, 105, 106 has, in a plane perpendicular to the direction of flow 11, a section that may extend longitudinally in a direction of elongation 13 perpendicular to the direction of flow 11 and to the direction of radiation 12.

Figure 1:
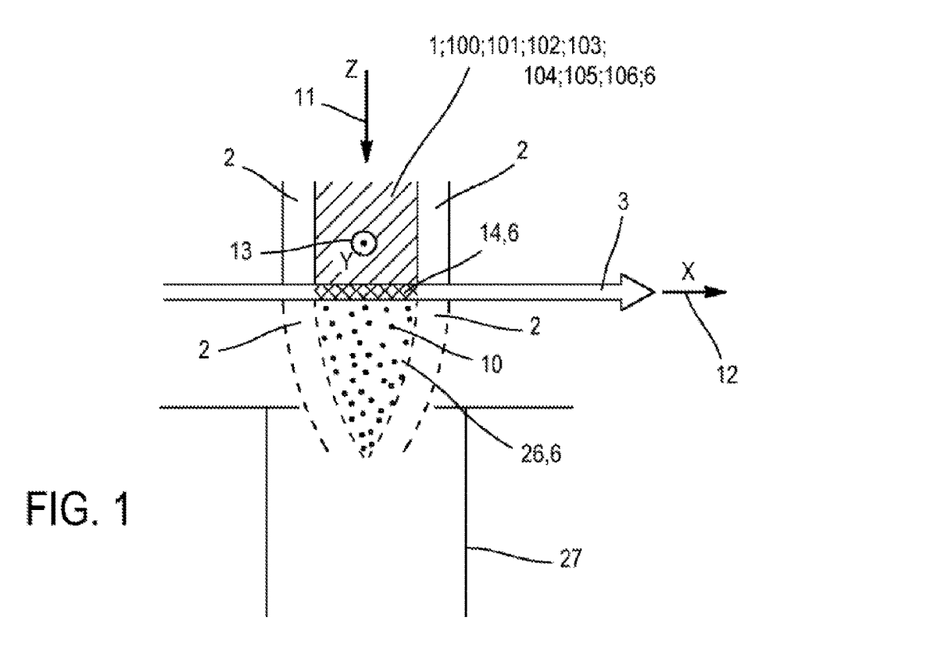
FIG. 1 is a diagrammatic cross-section profile view of a reaction stream (this may equally well be stream 1, 100, 101, 102, 103, 104, 105 or 106 depending on the variant considered) in a device according to the invention.
Figure 2:
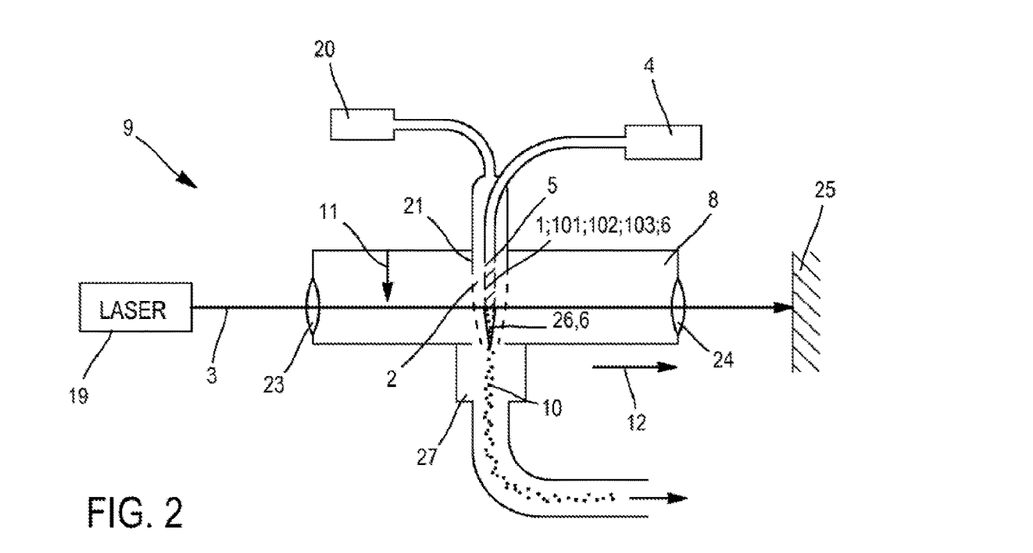
FIG. 2 is a diagrammatic cross-section profile view (this may equally well be at the level of stream 1, 101, 102, or 103 depending on the variant considered) of a device according to the invention.

In a first variant of the first embodiment of the device 9, which may correspond to the sectional view in FIG. 2, the reagent injector 5 is arranged in order to introduce into the chamber 8, and originating from the reagent source 4, a single reaction stream 1 that propagates in the direction of flow 11 in a reaction stream zone 6. The cross-section of the injector 5 is typically an oval with a depth of 4 mm in the direction 12 and a width of 2 cm in the direction 13.

Figure 3:
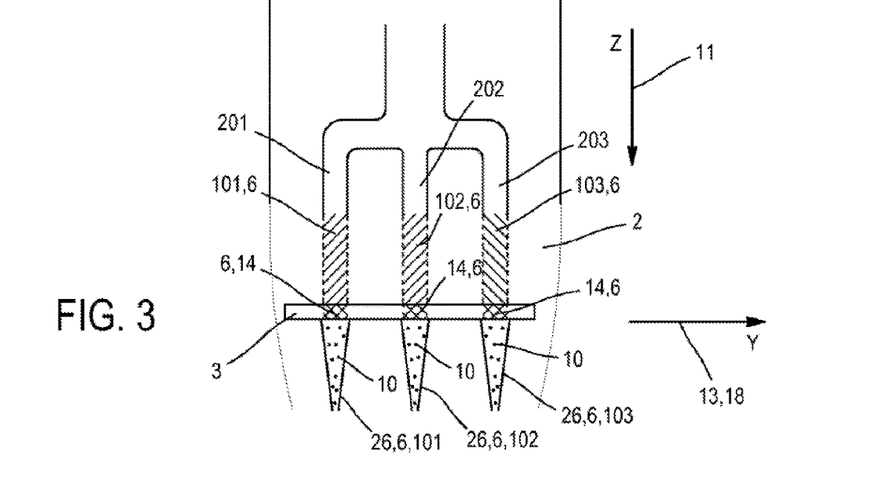
FIG. 3 is a diagrammatic cross-section front view of an alignment of reaction streams 101, 102, 103 in a device according to the invention.

In a second variant of the first embodiment of the device 9, which may correspond to the cross-section side view in FIG. 2 and the cross-section front view in FIG. 3, the injector 5 of at least one reaction stream is arranged in order to introduce, into the chamber 8 and originating from the reagent source 4, an alignment of several reaction streams 101, 102, 103 separated from one another by the confining gas stream 2 and each comprising the first chemical element and each propagating in the direction of flow 11.

Each stream 101, 102 or 103 propagates in the direction of flow 11 in its own reaction stream zone 6.

The injector 5 of at least one reaction stream 101, 102, 103 is arranged so that, within the alignment of streams 101, 102, 103, the various reaction streams 101, 102, 103 are aligned in a direction of alignment 18 perpendicular to the direction of flow 11 and to the direction of radiation 12.

As shown in FIG. 3, the injector 5 is subdivided into several injection nozzles 201, 202, 203 (one nozzle per reaction stream). Each nozzle has a section that is typically a disk, an oval or an oblong with depth of 3 mm in the direction 12 and with width of 4 mm in the direction 13, 18. The number of reaction streams 101, 102, 103 and of nozzles 201, 202, 203 is by no means limited to three; there could be many more of them, this number depending on the width of the laser spot, which can range from 2 to 5 cm or even more.

Figure 4:
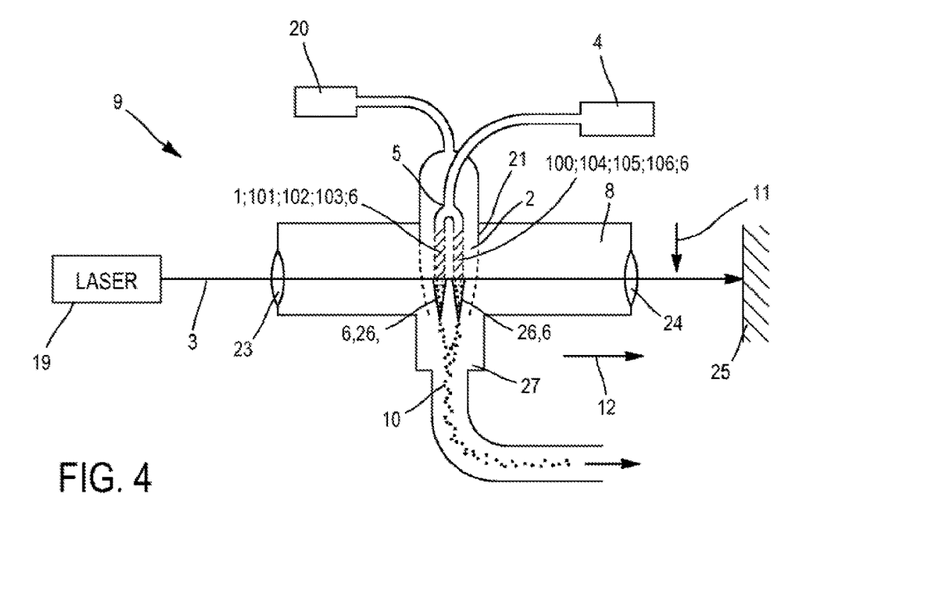
FIG. 4 is a diagrammatic cross-section profile view (this may equally well be at the level of steams 1, 100 or 101, 104 or 102, 105 or 103, 106 depending on the variant considered) of a variant of a device according to the invention.
Figure 5:
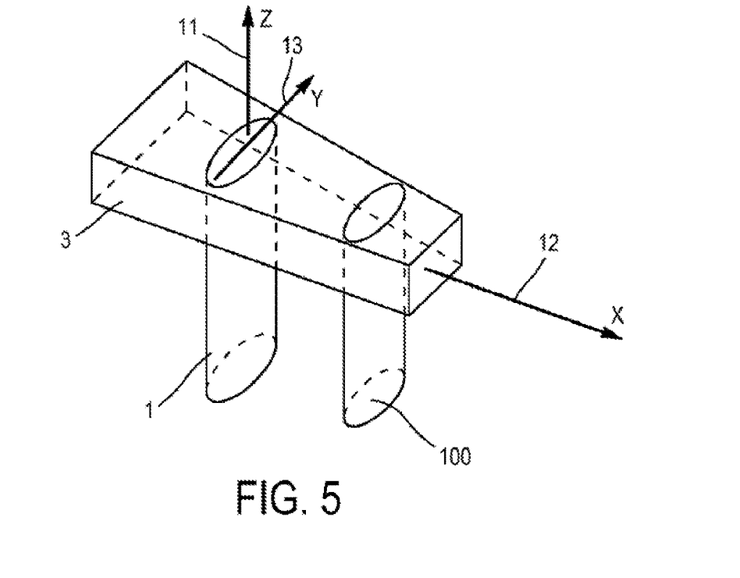
FIG. 5 is a perspective view of a reaction stream 1 accompanied by another optional reaction stream 100.

In a third variant of the first embodiment of the device 9, which may correspond to the cross-section side view in FIG. 4 and the perspective view in FIG. 5, the injector 5 of at least one reaction stream is arranged in order to introduce, into the chamber 8, several reaction streams 1, 100, separated from one another by the confining gas stream 2 and each comprising the first chemical element and each propagating in the direction of flow 11.

The reagent injector 5 is arranged in order to introduce, into the chamber 8 and originating from the reagent source 4, several reaction streams 1, 100, each stream 1, 100 propagating in the direction of flow 11 in its own reaction stream zone 6. These streams 1, 100 are spaced apart in the direction of radiation 12.

The losses of the beam 3 by absorption by the reaction stream 1 are compensated by the focusing (or "convergence") of the beam 3 so that the incident power density of the beam 3 on each stream 1 or 100 is identical for all the streams 1, 100 as described in document FR 2 877 591.

This variant makes it possible to increase the rate of production on a single reactor with optimum consumption of laser energy for production. There may be two streams 1, 100 one after another as shown in FIG. 5, or there may be 3, 4 or even more one after another, arranged in a row with a single laser beam 3.

Figure 6:
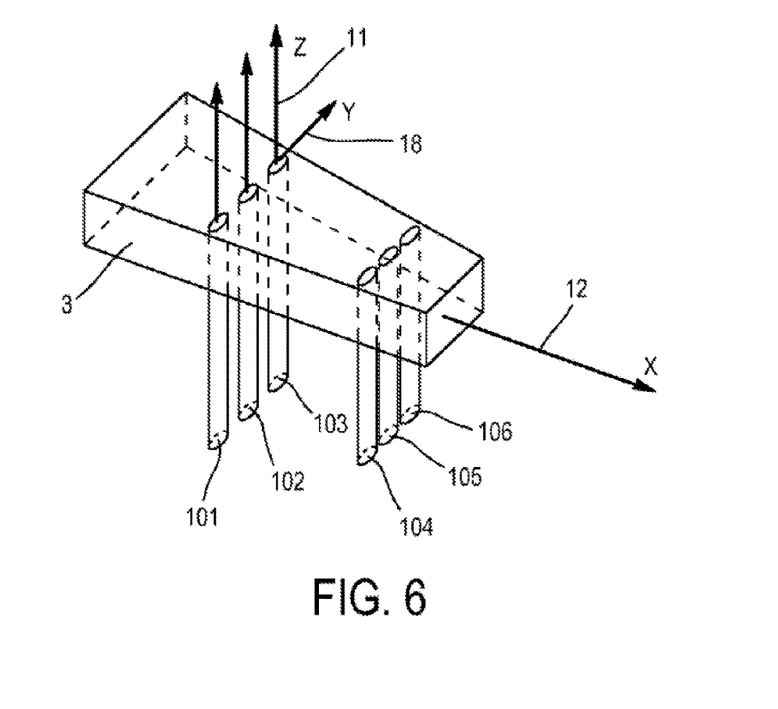
FIG. 6 is a perspective view of a first alignment of reaction streams 101, 102, 103 accompanied by another optional alignment of reaction streams 104, 105, 106.
Figure 7:
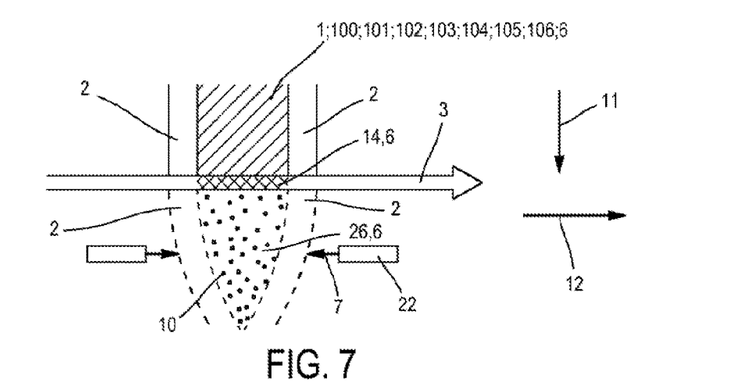
FIG. 7 is a diagrammatic cross-section profile view of a reaction stream (this may equally well be stream 1, 100, 101, 102, 103, 104, 105 or 106 depending on the variant considered) and of an annular injector 22 arranged for diffusing a peripheral gas stream 7.
Figure 8:
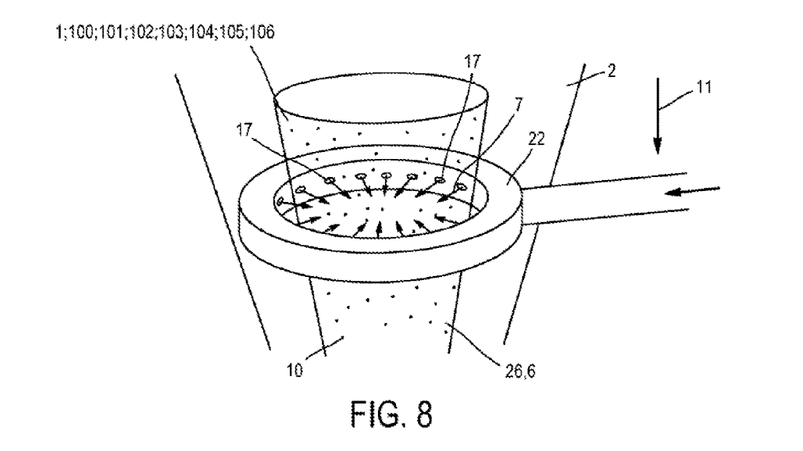
FIG. 8 is a diagrammatic perspective view of a reaction stream (this may equally well be stream 1, 100, 101, 102, 103, 104, 105 or 106 depending on the variant considered) and of the annular injector 22.

In a fourth variant of the first embodiment of the device 9, which may correspond to the cross-section side view in FIG. 4 and the perspective view in FIG. 6, the injector 5 of at least one reaction stream is arranged in order to introduce, into the chamber 8 and originating from the reagent source 4, several alignments of reaction streams separated from one another by the confining gas stream 2 and each comprising the first chemical element and each propagating in the direction of flow 11.

FIG. 6 shows a first alignment of streams 101, 102, 103 and a second alignment of streams 104, 105, 106.

Each stream 101, 102, 103, 104, 105 or 106 propagates in the direction of flow 11 in its own reaction stream zone 6.

The injector 5 of at least one reaction stream is arranged so that the streams 101, 102, 103 or 104, 104 and 105 respectively (or more precisely their cross-section in a plane perpendicular to the direction of flow 11) within each alignment are aligned in a direction of alignment 18 perpendicular to the direction of flow 11 and to the direction of radiation 12.

The alignments of streams are spaced apart in the direction of radiation 12.

The various alignments of streams are parallel to one another in the same direction 18.

The injector 5 is subdivided into several injection nozzles (one nozzle per reaction stream). Each nozzle has a cross-section that is typically an oval with a depth of 3 mm in the direction 12 and with a width of 4 mm in the direction 13, 18.

The losses of beam 3 by absorption by the first alignment of streams 101, 102, 103 are compensated by the focusing (or "convergence") of the beam 3 so that the incident power density of the beam 3 on each alignment of streams 101, 102, 103 or 104, 105, 106 is identical for all the streams 101, 102, 103, 104, 105 or 106 according to the principle described in document FR 2 877 591.

Referring to FIGS. 1 to 6, in the first embodiment of the device 9 according to the invention (whatever variant thereof is considered from its four variants described above), the injector of the second chemical element is arranged in order to introduce the second element into the chamber 8 with the first chemical element in each reaction stream 1, 100, 101, 102, 103, 104, 105, 106 before (relative to the direction of flow 11) the interaction zone 14 of each reaction stream.

The injector of the second chemical element comprises the reagent injector 5. More precisely, the injector of the second chemical element and the reagent injector 5 are combined.

Referring to FIGS. 1 to 6, a second embodiment of the device 9 according to the invention is strictly identical to the first embodiment of the device 9 described above (whatever variant is considered from its four variants described above), apart from the fact that the injector of the second chemical element is arranged in order to introduce the second chemical element into the chamber 8 in a gas stream 2 surrounding each reaction stream 1, 100, 101, 102, 103, 104, 105, 106.

More precisely, the injector of the second chemical element is arranged in order to introduce the second chemical element into the chamber 8 in the confining gas stream 2 before (relative to the direction of flow 11) the interaction zone 14 of each reaction stream.

The injector of the second chemical element comprises the injector 21 of confining gas. More precisely, the injector of the second chemical element and the injector 21 of confining gas are combined.

This second embodiment is preferably implemented within the second or fourth variant (comprising one or more alignment(s) of streams 101, 102, 103 and 104, 105, 106 in FIGS. 3 and 6) as this makes it possible to maximize the area of interaction between the confining gas 2 comprising the second chemical element and each reaction stream comprising the first chemical element.

Referring to FIGS. 2 to 8, a third embodiment of the device 9 according to the invention is strictly identical to the first embodiment of the device 9 described above (whatever variant is considered from its four variants described above), apart from the fact that the injector of the second chemical element is arranged in order to introduce the second chemical element into the chamber 8 in a gas stream 7 surrounding each reaction stream 1, 100, 101, 102, 103, 104, 105, 106.

The injector of the second chemical element comprises an injector 22 (preferably of annular shape):
per reaction stream 1, 100, 101, 102, 103, 104, 105, 106, or
common, surrounding all the reaction streams overall.

For each reaction stream considered 1, 100, 101, 102, 103, 104, 105, or 106, the injector of the second chemical element is arranged in order to introduce the second chemical element into the chamber 8 in a peripheral gas stream 7 surrounding this reaction stream 1, 100, 101, 102, 103, 104, 105, or 106 and emitted from several points 17 distributed along a closed curve (typically annular shape of injector 22) surrounding this reaction stream and arranged in order to direct the peripheral gas stream 7 in the direction of this reaction stream.

For each reaction stream considered 1, 100, 101, 102, 103, 104, 105, or 106, the injector of the second chemical element is arranged in order to introduce the second chemical element into the chamber 8 in the peripheral gas stream 7 after (relative to the direction of flow 11) the interaction zone 14 of this reaction stream. This is particularly beneficial, as it makes it possible to have good control (by adjusting the power of the beam 3) and good uniformity of manufacture of the cores 15 of the particles 10. Manufacture of the layers 16 on the cores 15 of the particles will not take energy directly from the beam 3 and therefore does not disturb the control of the manufacture of the cores 15. In fact, manufacture of the layers 16 on the particle cores 15 utilizes the energy of the flame 26 after the interaction zone 14.

This third embodiment of the device 9 comprises means for moving (not shown, comprising for example a microdisplacement stage) each injector 22 in the direction of flow 11 so as to optimize the layer 16 manufactured for the particles 10.

Of course, the different variants and the different embodiments of the device according to the invention that have just been described may be combined with one another, and the injector of the second chemical element may therefore comprise:
the reaction stream injector 5, and/or (preferably and)
at least one (optionally both) of:
the confining gas injector 21 of, and/or
an injector 22 of peripheral gas 7 per reaction stream or a common injector 22 of peripheral gas 7 surrounding all the reaction streams overall.

A description will now be given of the process implemented in any one of the embodiments of the device 9 that has just been described.

This process according to the invention for producing particles 10 by laser pyrolysis comprises the following steps:
introducing into the reaction chamber 8, via the injector 5 and originating from the source 4, at least one reaction stream 1, 100, 101, 102, 103, 104, 105, 106 comprising the first chemical element and propagating in the direction of flow 11; each reaction stream comprises reagent during its introduction; the typical gas flow rate of reagent introduced into the chamber 8 is about 20 liters per minute.
introducing into the reaction chamber 8, before (relative to the direction of flow 11) the interaction zone 14 of each reaction stream, the confining gas stream 2 surrounding each reaction stream 1, 100, 101, 102, 103, 104, 105, 106 and propagating in the direction of flow 11; the typical flow rate of confining gas introduced into the chamber 8 is about 50 liters per minute.
projecting, by the emitter 19, the radiation beam 3 through the reaction chamber 8 at intersection, in one interaction zone 14 per reaction stream, with each reaction stream 1, 100, 101, 102, 103, 104, 105, 106 in order to form, in each reaction stream, particle cores 15 comprising the first chemical element, and
introducing, into the reaction chamber 8, the second chemical element interacting with each reaction stream 1, 101, 102, 103, 104, 105, 106 in order to cover the particle cores 15 with a layer 16 (corresponding to each particle 10 and independent of the layer 16 of the other particles 10) comprising the second chemical element.

As seen above, the reagent of the reaction stream is devoid of agent that oxidizes the first chemical element. Thus, the particle cores 15 obtained by the process according to the invention comprise the first chemical element in the non-oxidized form.

The number of atoms introduced per unit of time is in a molar ratio allowing the desired thickness to be attained for producing a layer 16 of aluminium or of aluminium oxide obtained by oxidation of the layer of aluminium.

The radiation beam 3 propagates in the direction of radiation 12 perpendicular to the direction of flow 11.

Each reaction stream has, in a plane perpendicular to the direction of flow 11, a section extending longitudinally in the direction of elongation 13 perpendicular to the direction of flow 11 and to the direction of radiation 12.

The particles 10 thus manufactured drop into a recovery device 27 where they are cooled before being conveyed by gravity and/or vacuum to a plant that uses the particles or to a container for storage.

In a first embodiment of the process according to the invention implemented in the first embodiment of the device according to the invention, the second chemical element is introduced into the chamber 8 with the first chemical element in the reagent in each reaction stream 1, 100, 101, 102, 103, 104, 105, 106 before (relative to the direction of flow 11) the interaction zone 14 of each reaction stream.

In a second or third embodiment of the process according to the invention implemented in the second or third embodiment of the device according to the invention, the second chemical element is introduced into the chamber 8 in a gas stream 2 or 7 surrounding each reaction stream 1, 100, 101, 102, 103, 104, 105, 106 and in contact with each reaction stream 1, 100, 101, 102, 103, 104, 105, 106.

In a second embodiment of the process according to the invention implemented in the second embodiment of the device according to the invention, the second chemical element is introduced into the chamber 8 in the confining gas stream 2 before (relative to the direction of flow 11) the interaction zone 14 of each reaction stream.

This embodiment is particularly beneficial when, as described above with reference to FIG. 3 or 6, the introduction of at least one reaction stream comprises an introduction of several aligned reaction streams (alignment 101, 102, 103 and optionally in addition alignment 104, 105, 106) separated from one another by the confining gas stream 2 and each comprising the first chemical element and each propagating in the direction of flow 11. It should be noted that in that case, as shown in FIG. 3, the confining gas stream 2 is preferably common to all the reaction streams and there is no discontinuity between the various reaction streams. Moreover, the radiation beam 3 propagates in the direction of radiation 12 perpendicular to the direction of flow 11, and the various reaction streams 101, 102, 103 or 104, 105, 106 within an alignment are aligned in the direction of alignment 18 perpendicular to the direction of flow 11 and to the direction of radiation 12.

In a third embodiment of the process according to the invention implemented in the third embodiment of the device according to the invention, the second chemical element is introduced into the chamber 8 in a peripheral gas stream 7 surrounding each reaction stream 1, 100, 101, 102, 103, 104, 105, 106, emitted from several points 17 distributed along a closed curve surrounding each reaction stream and propagating in the direction of the reaction stream. The second chemical element is introduced into the chamber 8 in the peripheral gas stream 7 after (relative to the direction of flow 11) the interaction zone 14 of each reaction stream.

Thus, to summarize what each of the streams generally contains:
- each reaction stream 1, 100, 101, 102, 103, 104, 105, 106 comprises (preferably consists only of):
  - in all cases, a type of molecule comprising the first chemical element. In the case when this first chemical element is silicon, this molecule is preferably a silicon-based organometallic (generally in the form of vaporized liquid). This molecule may for example be hexamethyldisilazane. This molecule may also for example be silane ($SiH_4$).
  - Optionally, if the core 15 is of silicon carbide, a type of molecule comprising carbon, for example an alkene or an alkane. This molecule may for example be $C_2H_2$ or $C_2H_4$ or $CH_4$.
  - Optionally a neutral gas or a mixture of neutral gases from helium, argon, krypton, xenon, nitrogen.
  - Optionally, in the first embodiment of the process according to the invention, a type of molecule comprising aluminium. This molecule may for example be vaporized trimethylaluminium ($Al(CH_3)_3$). In general, a compound in the class of aluminium organometallics may be used.
- each confining gas stream 2 comprises (preferably consists only of):
  - in all cases, a neutral gas or a mixture of neutral gases from helium, argon, krypton, xenon, nitrogen.
  - Optionally, in the second embodiment of the process according to the invention, a type of molecule comprising the second chemical element. This molecule may for example be vaporized trimethylaluminium ($Al(CH_3)_3$). In general, a compound in the class of aluminium organometallics may be used.
- each peripheral gas stream 7, present only in the third embodiment of the process according to the invention, comprises (preferably consists only of):
  - in the third embodiment of the process according to the invention, a type of molecule comprising the second chemical element. This molecule may for example be vaporized trimethylaluminium ($Al(CH_3)_3$). In general, a compound in the class of aluminium organometallics may be used.
  - Optionally a neutral gas or a mixture of neutral gases from helium, argon, krypton, xenon, nitrogen.

Of course, various combinations of processes according to the invention described above may be envisaged, in which the second chemical element is introduced into the chamber 8:
- with the first chemical element in each reaction stream 1, 100, 101, 102, 103, 104, 105, 106, and/or
- in a gas stream 2 or 7 surrounding each reaction stream 1, 100, 101, 102, 103, 104, 105, 106 and in contact with each reaction stream 1, 100, 101, 102, 103, 104, 105, 106, in particular:
  - in the confining gas stream 2, and/or
  - in one peripheral gas stream 7 per reaction stream or in a common peripheral gas stream 7 surrounding all the reaction streams overall.

Example 1: Third Embodiment of the Process According to the Invention; Core 15 Comprising Non-Oxidized Silicon; Layer 16 of Aluminium In this example, the first chemical element is silicon.

The second chemical element is pure aluminium, which may be oxidized after production.

The laser used is a $CO_2$ laser, the surface density of incident energy is 800 W per square centimeter.

The first chemical element is introduced at ambient temperature (approximately 20° C.) into the chamber 8 in the form of gaseous $SiH_4$, at approximately 18 liters per minute of gaseous $SiH_4$.

The reagent of each reaction stream is thus gaseous silane ($SiH_4$) that is not mixed with oxidizing agents or with oxygen atoms or with molecules comprising oxygen atoms, so that the particle cores 15 comprise (and even preferably consist of), preferably non-oxidized, silicon (Si).

The confining gas 2 comprises a neutral gas (gaseous argon) introduced into the chamber 8 at ambient temperature at 50 liters per minute.

The second chemical element is introduced into the reaction chamber in the form of trimethylaluminium (or TMA, of chemical formula $Al(CH_3)_3$) or generally in the form of a compound in the class of aluminium organometallics. It is introduced into the chamber at a temperature of 50° C. in the peripheral gas stream 7, which also carries neutral argon gas. The total gas flow rate Argon+TMA is 33 liters per minute gaseous.

The number of aluminium atoms introduced (which plays the role of the second element here) relative to the number of atoms of the first element (silicon) introduced is a ratio of one aluminium atom to 3.7 silicon atoms (1 mole of $Al(CH_3)_3$ to 3.7 moles of $SiH_4$).

The layer 16 of each particle thus obtained is of non-oxidized aluminium.

At the outlet of the recovery device, the particles 10 are optionally:
- protected from oxygen or generally from oxidation until they are stored (preferably in a container not integral with the chamber 8), so that the layer 16 of each particle thus stored is still non-oxidized aluminium, or
- subjected to slow oxidation so that the layer 16 of aluminium (but not the core 15) of each particle is oxidized.

The particles obtained may then be used, by various processes including:
- a process that is characterized in that a component is manufactured by sintering a powder comprising these particles (typically heating at 1000° C.), and/or
- a process in which aluminium particles are mixed with particles according to the invention having a core 15 covered with a layer 16 of aluminium, then in which the mixture is heated (typically at 1000° C.) and then cooled so as to bond the aluminium particles with the particles according to the invention, in order to obtain a material of aluminium enriched with what constitutes the core 15 of the particles according to the invention.

Example 2: Third Embodiment of the Process According to the Invention; Core 15 Comprising Non-Oxidized Silicon Carbide (SiC); Layer 16 of Aluminium Example 2 will only be described where it differs from example 1. Example 2 is identical to example 1, except that in example 2 the surface density of incident energy is 1500 W per square centimeter and the reagent in each reaction stream is a mixture of:
- gaseous silane ($SiH_4$) not mixed with oxidizing agents or with oxygen atoms or with molecules comprising oxygen atoms, and
- gaseous $C_2H_2$ not mixed with oxidizing agents or with oxygen atoms or with molecules comprising oxygen atoms so that the particle cores 15 comprise (preferably consist of) silicon carbide (SiC), preferably not oxidized.

Particles Obtained

Particles according to the first example were manufactured according to example 1 and example 2 with the third embodiment of device 9 alone (i.e. with the third embodiment of the process according to the invention). They are subjected to slow oxidation at the end of production so as to generate a layer of aluminium oxide.

The size of the particles 10 obtained corresponds to an average core diameter $D_1$ determined from measurement of the specific surface and density:
- of 100 nm in example 1 and
- of 30 nm in example 2, and a thickness of layer 16 (half of $D_2-D_1$) of aluminium oxide of about 3-10 nm thick.

Figure 9:
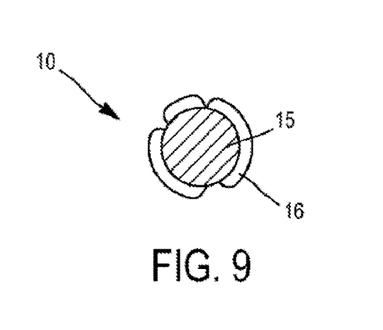
FIG. 9 is a diagrammatic cross-section profile view of a particle manufactured according to the invention.
Figure 10:
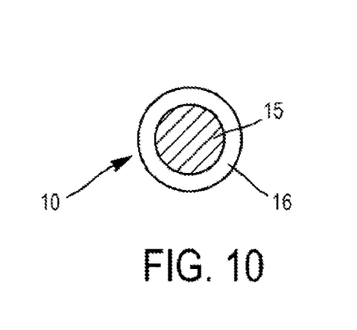
FIG. 10 is a diagrammatic cross-section profile view of another particle manufactured according to the invention.

By transmission electron microscopy techniques, it is possible to see particles 10 (often combined in solid aggregates and/or agglomerates owing to interactions of the van der Waals type between the particles). The homogeneity of the layer 16 is excellent (for example by comparison between FIGS. 9 and 10) using the third embodiment of the process according to the invention, in which the second chemical element is introduced into the chamber 8 in a gas stream 7 surrounding each reaction stream 1, 100, 101, 102, 103, 104, 105, 106 and in contact with each reaction stream 1, 100, 101, 102, 103, 104, 105, 106. Thus, referring to FIG. 10, for each particle 10 a layer 16 of almost uniform thickness is obtained, which covers the whole of its core 15. The particles are almost spherical, and are reminiscent of faceted balls.

Figure 11:
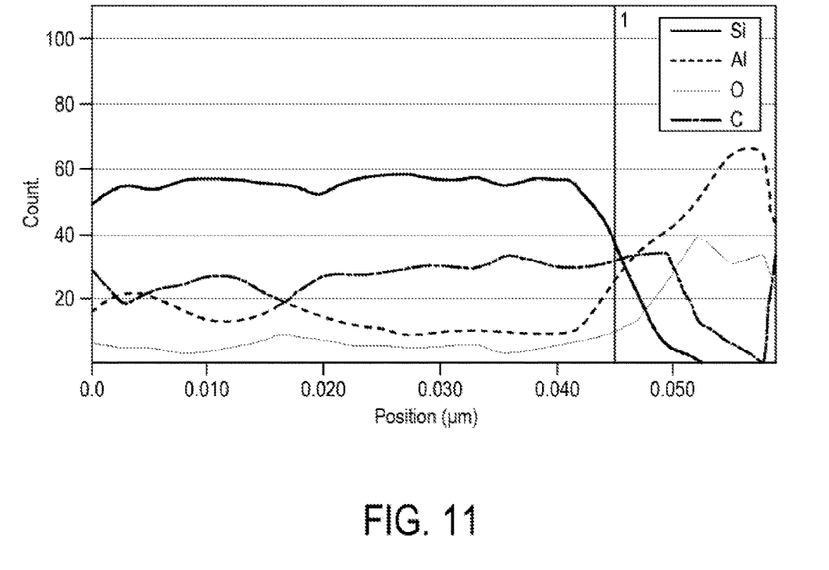
FIG. 11 is a graph of detection of chemical elements by techniques of transmission electron microscopy and of loss of electron energy (STEM/HAADS/EELS), as a function of the position along a segment starting from a core of a particle and reaching the layer 16 of this same particle and then the exterior of this particle.

FIG. 11 is a graph of detection of chemical elements by STEM/EELS techniques of transmission electron microscopy, as a function (on the x-axis) of the position along a segment starting from a core 15 of a particle and continuing over the layer 16 of this same particle and then to the exterior of this particle. The y-axis shows intensity related to the proportion of the elements detected.

In the layer 16, aluminium and oxygen are detected, but not carbon or silicon.

In the core 15, silicon and carbon are detected.

At the level of the core 15, a small quantity of aluminium and oxygen is also detected, due to the fact that the imaged zone of core 15 is superimposed on the layer 16. In fact it is a profile obtained by moving an analysis probe along an axis situated above the particle, and when the probe moves over the core 15 this leads to superposition of the majority signals from the core and the minority signals from the surface.

It can be seen that in example 1 and example 2, the layer 16 does not comprise the first chemical element (in any form).

It can be seen that in example 1 and example 2, the core 15 does not comprise the first chemical element in the oxidized form, but comprises this first chemical element only in the non-oxidized form.

The third embodiment of the invention is therefore preferred for several reasons:
- better homogeneity of the layer 16,
- better control and homogeneity of the cores 15.

Better results are seen from the third embodiment alone than from the second and first embodiment alone.

For comparison, on modifying the first and second examples in the context of the second embodiment of the process according to the invention, poorer control of the core 15 is noted, and problems of homogeneity. In particular, it can be seen that certain cores 15 additionally comprise the second chemical element (traces of aluminium), and the existence of particles consisting of aluminium is noted.

For comparison, on modifying the first and second examples in the context of the first embodiment of the process according to the invention, additional problems of homogeneity are observed.

Of course, the invention is not limited to the examples which have just been described and numerous adjustments can be made to these examples without exceeding the scope of the invention.

In particular, the examples and embodiments described above are not incompatible with the existence of an interface between the core 15 and the layer 16 of one and the same particle.

Of course, the various features, forms, variants and embodiments of the invention may be combined together in various combinations provided they are not incompatible or exclusive of one another. In particular, all the variants and embodiments described above can be combined.

The invention claimed is:

1. A process for producing particles, comprising the following steps:
   - introducing, into a reaction chamber, at least one reaction stream comprising silicon as a first chemical element and propagating in a direction of flow;
   - projecting a radiation beam through the reaction chamber intersecting with each reaction stream in one interaction zone per reaction stream, in order to form, in each reaction stream, particle cores comprising the first chemical element; and
   - introducing, into the reaction chamber, a second chemical element interacting with each reaction stream to cover the particle cores with a layer comprising the second chemical element, wherein the second chemical element is aluminium;
   - introducing the second chemical element into the reaction chamber in a peripheral gas stream surrounding each reaction stream, said second chemical element being emitted from several points distributed along a closed curve surrounding each reaction stream and propagating toward each reaction stream, the second chemical element being introduced into the reaction chamber in the peripheral gas stream after the interaction zone of each reaction stream; and/or introducing, before the interaction zone of each reaction stream, the second chemical element into the reaction chamber in a confining gas stream surrounding each reaction stream along a perimeter of each reaction stream, and propagating parallel to the direction of flow of each reaction stream, the second chemical element being introduced into the reaction chamber in the confining gas stream before the interaction zone of each reaction stream.

2. The process according to claim 1, wherein each reaction stream is devoid of any agent that oxidizes the first chemical element, and the particle cores comprise the first chemical element in the non-oxidized form.

3. The process according to claim 1, wherein the second chemical element is introduced into the chamber in the peripheral gas stream surrounding each reaction stream, emitted from several points distributed along the closed curve surrounding each reaction stream and propagating in the direction of each reaction stream, the second chemical element being introduced into the chamber in the peripheral gas stream after the interaction zone of each reaction stream.

4. The process according to claim 1, further comprising a step of introducing, into the reaction chamber, before the interaction zone of each reaction stream, the confining gas stream surrounding each reaction stream and propagating in the direction of flow, the second chemical element being introduced into the chamber in the confining gas stream before the interaction zone of each reaction stream.

5. The process according to claim 4, wherein the introduction of at least one reaction stream comprises introducing at least one alignment of several reaction streams separated from one another by the confining gas stream and each comprising the first chemical element and each propagating in the direction of flow.

6. The process according to claim 5, wherein the radiation beam propagates in a direction of radiation perpendicular to the direction of flow, and in that the streams of each alignment of reaction streams are aligned in a direction of alignment perpendicular to the direction of flow and to the direction of radiation.

7. The process according to claim 1, wherein the radiation beam propagates in a direction of radiation perpendicular to the direction of flow, and in that each reaction stream has, in a plane perpendicular to the direction of flow, a section extending longitudinally in a direction of elongation perpendicular to the direction of flow and to the direction of radiation.

8. The process according to claim 1, wherein the second chemical element is introduced into the chamber with the first chemical element in each reaction stream before the interaction zone of each reaction stream.

9. The process according to claim 1, wherein the first chemical element is introduced into the chamber in the form of SiH4.

10. The process according to claim 1, wherein the cores of particles are of silicon.

11. The process according to claim 1, wherein carbon is introduced into the chamber with the first chemical element in each reaction stream before the interaction zone of each reaction stream, so that the particle cores comprise silicon carbide.

12. The process according to claim 1, wherein the layer comprising the second chemical element of a given particle is independent of the layer comprising the second chemical element of the other particles.

* * * * *